United States Patent
Zhang et al.

(10) Patent No.: US 9,838,192 B2
(45) Date of Patent: Dec. 5, 2017

(54) CARRIER AGGREGATION SECONDARY COMPONENT CARRIER MANAGEMENT

(71) Applicant: Apple Inc., Cupertino, CA (US)

(72) Inventors: Wanping Zhang, San Jose, CA (US); Li Su, San Jose, CA (US); Yingjie Zhao, Pleasanton, CA (US)

(73) Assignee: APPLE INC., Cupertino, CA (US)

( * ) Notice: Subject to any disclaimer, the term of this patent is extended or adjusted under 35 U.S.C. 154(b) by 25 days.

(21) Appl. No.: 14/501,814

(22) Filed: Sep. 30, 2014

(65) Prior Publication Data

US 2016/0095086 A1     Mar. 31, 2016

(51) Int. Cl.
| | |
|---|---|
| *H04L 5/00* | (2006.01) |
| *H04W 76/06* | (2009.01) |
| *H04W 76/02* | (2009.01) |
| *H04W 72/12* | (2009.01) |
| *H04W 88/02* | (2009.01) |

(52) U.S. Cl.
CPC ............ *H04L 5/0098* (2013.01); *H04L 5/001* (2013.01); *H04L 5/0085* (2013.01); *H04L 5/0023* (2013.01); *H04W 88/02* (2013.01)

(58) Field of Classification Search
CPC ..... H04L 5/001; H04B 17/309; H04W 72/082
USPC ................................. 370/329; 455/439, 515
See application file for complete search history.

(56) References Cited

U.S. PATENT DOCUMENTS

| | | | |
|---|---|---|---|
| 2005/0025182 A1* | 2/2005 | Nazari ................. | H04W 88/06 370/469 |
| 2009/0067386 A1* | 3/2009 | Kitazoe ............... | H04J 11/0069 370/332 |
| 2012/0057490 A1* | 3/2012 | Park ....................... | H04L 5/001 370/252 |
| 2012/0106450 A1* | 5/2012 | Golitschek Edler Von Elbwart ............... | H04L 1/003 370/328 |
| 2013/0016690 A1* | 1/2013 | Jeong ................... | H04W 24/10 370/329 |
| 2013/0028119 A1* | 1/2013 | Ben-Eli ................ | H04W 48/16 370/252 |
| 2013/0136015 A1* | 5/2013 | Ojala ..................... | H04L 5/001 370/252 |
| 2015/0341148 A1* | 11/2015 | Kazmi ................. | H04L 5/0098 370/252 |

* cited by examiner

*Primary Examiner* — Asad Nawaz
*Assistant Examiner* — Jason Harley
(74) *Attorney, Agent, or Firm* — Fay Kaplun & Marcin, LLP

(57) ABSTRACT

This disclosure relates to management of a secondary component carrier by a wireless device when using carrier aggregation. According to one embodiment, a primary component carrier for communication between a base station and a wireless device may be configured according to a first wireless communication technology. A secondary component carrier may also be configured. The wireless device may detect a trigger condition to deactivate the secondary component carrier. In response, the wireless device may modify its feedback to the base station with respect to channel conditions for the secondary component carrier to cause the base station to deactivate the secondary component carrier.

22 Claims, 4 Drawing Sheets

CARRIER AGGREGATION SECONDARY COMPONENT CARRIER MANAGEMENT

FIELD

The present application relates to wireless devices, and more particularly to a system and method for wireless devices to manage a secondary component carrier when communicating using carrier aggregation.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Carrier Aggregation is a technique which allows a wireless device with multiple communication chains to communicate data using multiple component carriers. Management of a wireless device's communication chains for optimal performance is a complex problem, and improvements in the field would be desirable.

SUMMARY

Embodiments are presented herein of methods for a wireless device to manage its component carriers during carrier aggregation, and of devices configured to implement the methods.

According to the techniques described herein, a wireless device may communicate with a base station according to a first wireless communication technology, such as LTE, to establish a primary component carrier, which may be used for control communications, data communications, etc.

Additionally, the wireless device may communicate with the base station according to the same wireless communication technology to establish a secondary component carrier. The secondary component carrier may be used for data communications; at least in some instances, control communications relating to the secondary component carrier may be performed via the primary component carrier.

Activation and deactivation of the secondary component carrier may be controlled by the base station, for example based on radio conditions, buffer condition, data type, network traffic considerations, and/or any of various other factors.

In some instances, it may be the case that the wireless device has an alternate use for a secondary communication chain, such as performing inter radio access technology search or measurement, background public land mobile network search, or any of various other possible uses, but a secondary component carrier is active.

In such a case, according to the techniques described herein, a wireless device may modify its feedback to the base station with respect to the secondary component carrier, in order to cause the base station to deactivate the secondary component carrier, which may in turn allow the wireless device to use its secondary communication chain for the alternate use. For example, the wireless device might modify its channel condition feedback (such as a channel quality indicator report) to indicate worse channel conditions that experienced by the wireless device. As another example, the wireless device might report higher than experienced block error rate, by either not acknowledging packets received via the secondary component carrier, or sending negative acknowledgement responses to successfully received packets, or both.

Additionally, in some instances, it may be the case that while the wireless device is using a secondary communication chain, the base station may indicate to the wireless device to activate the secondary component carrier. In such a case, according to the techniques described herein, the wireless device may simply not acknowledge the indication to activate the secondary component carrier. In this case, the secondary component carrier may remain inactive, and the wireless device may be able to continue using its secondary communication chain for other purposes.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
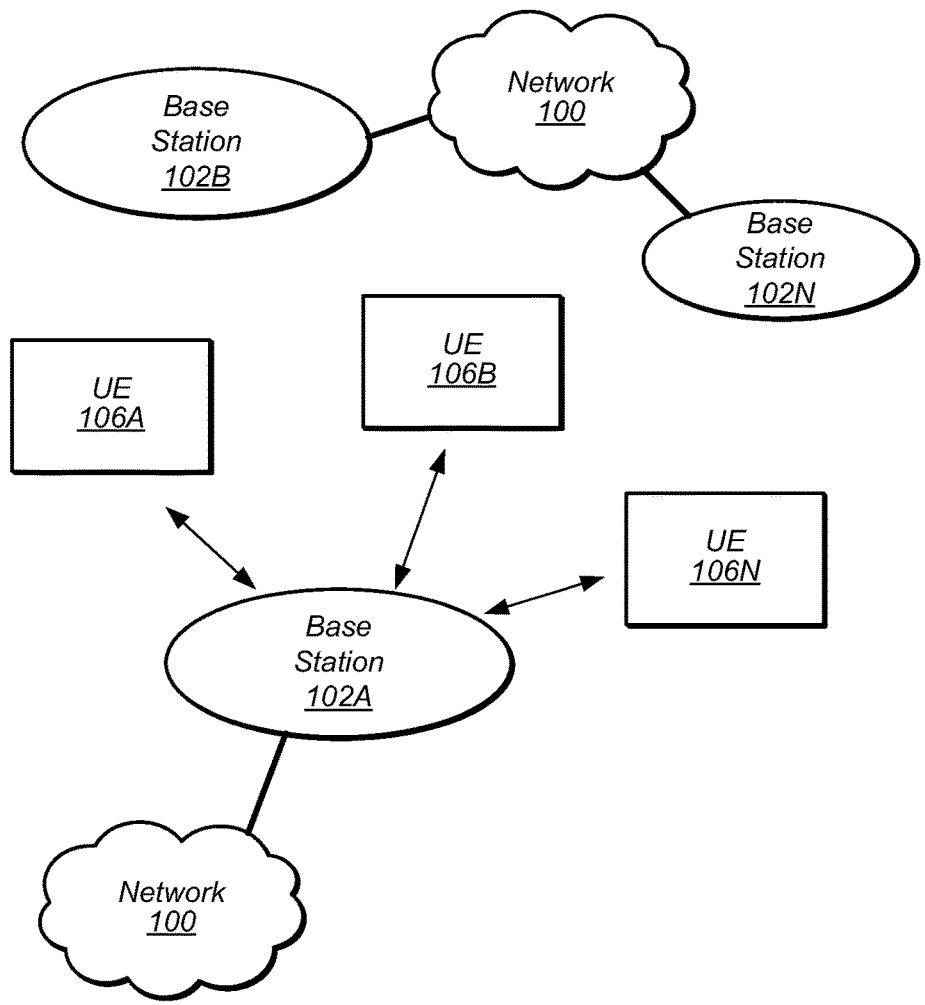
FIG. 1 illustrates an exemplary (and simplified) wireless communication system, according to one embodiment.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
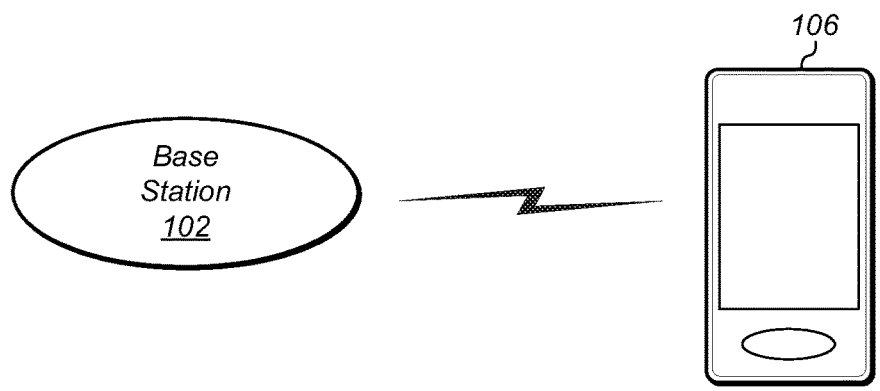
FIG. 2 illustrates a base station (BS) in communication with a user equipment (UE) device, according to one embodiment.

FIGS. 1 and 2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to one embodiment. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

Figure 3:
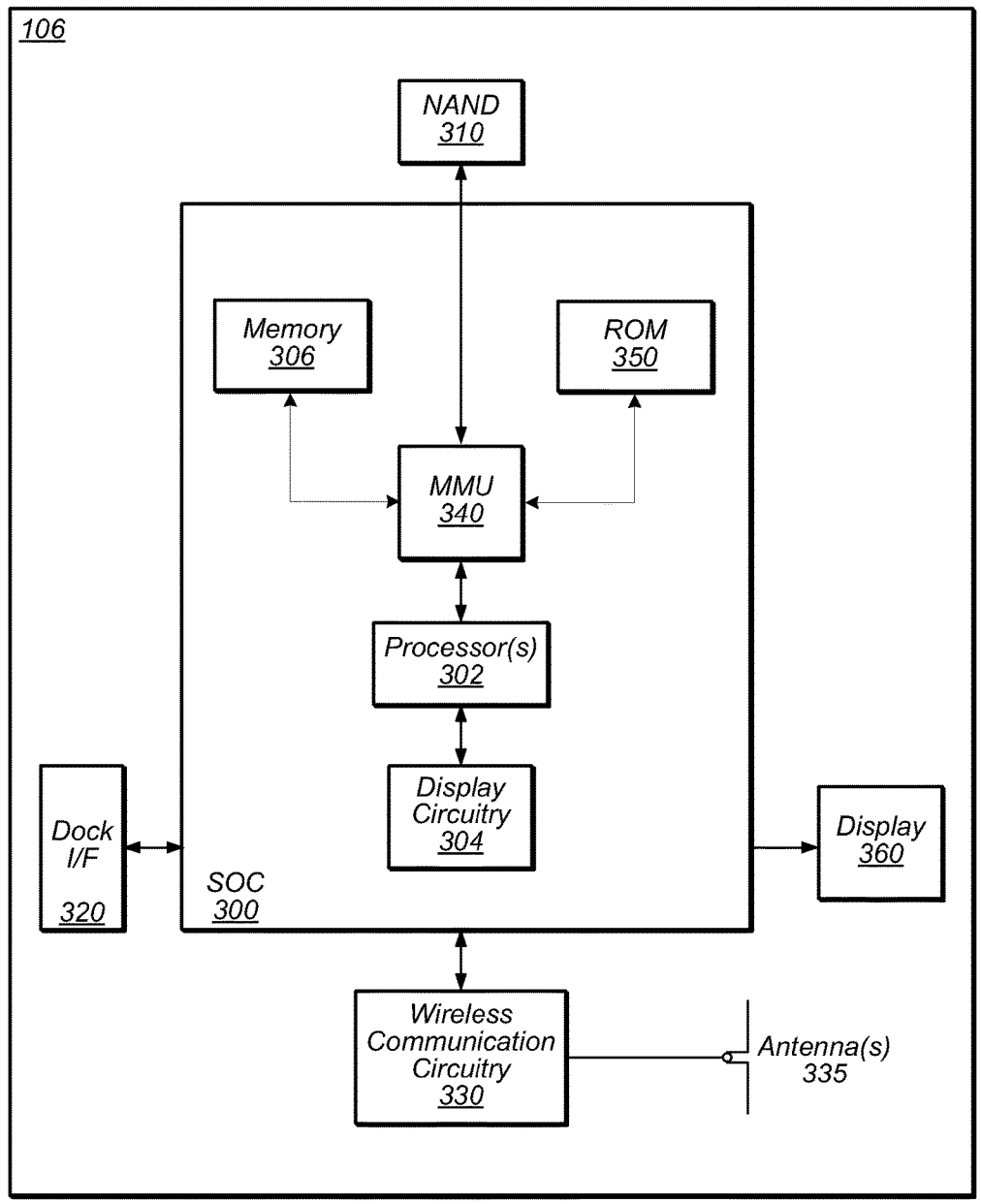
FIG. 3 illustrates an exemplary block diagram of a UE, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for managing a secondary component carrier, such as those described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 4:
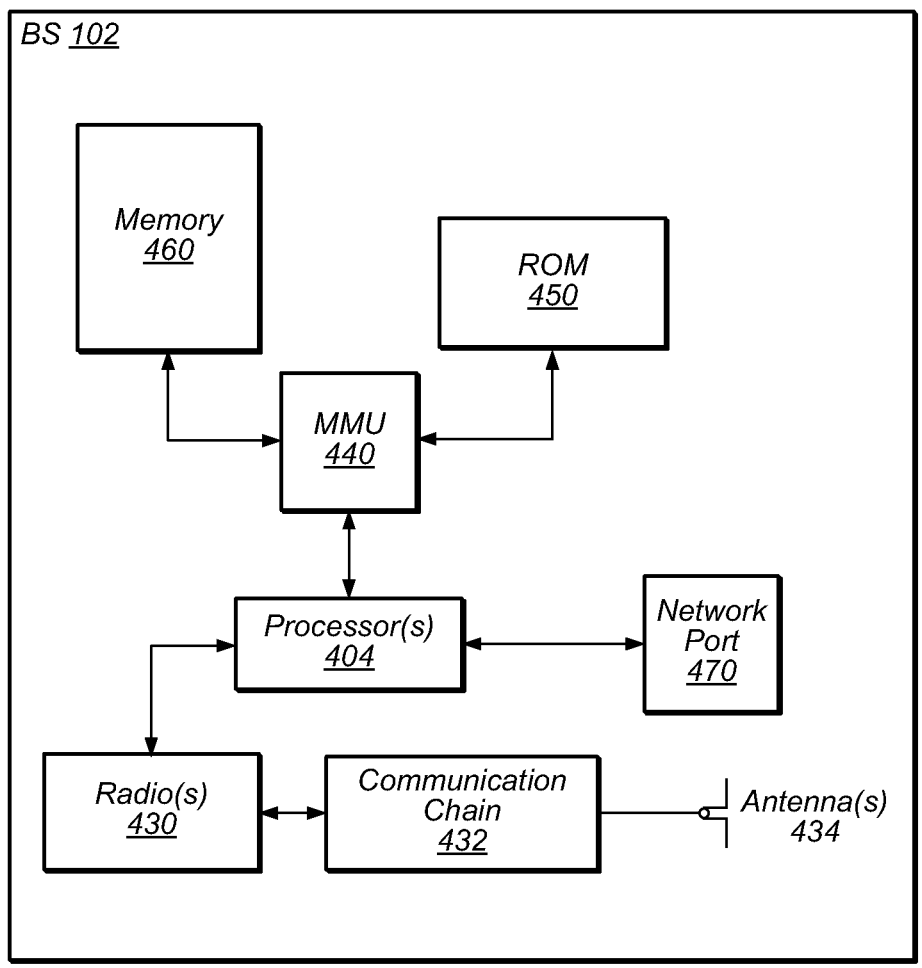
FIG. 4 illustrates an exemplary block diagram of a BS, according to one embodiment.

FIG. 4—Exemplary Block Diagram of a Base Station

FIG. 4 illustrates an exemplary block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

Figure 6:
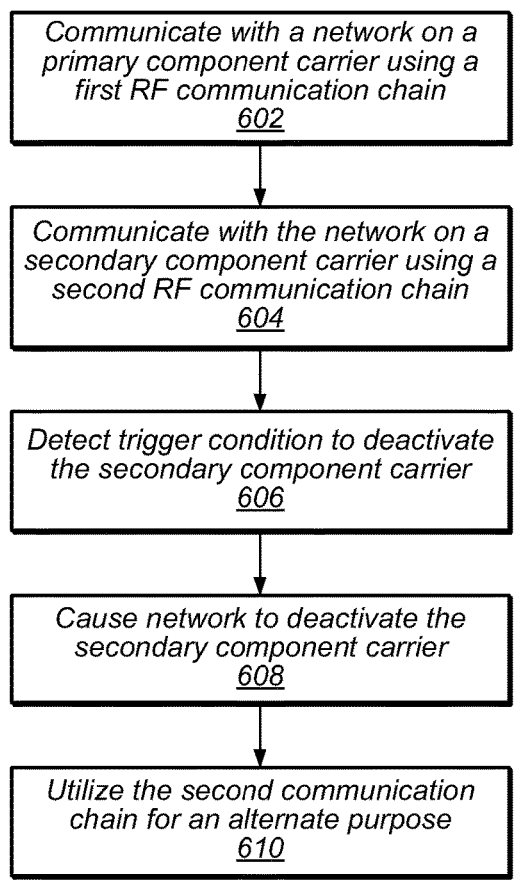
FIG. 6 is a flowchart diagram illustrating an exemplary method for a wireless device to manage a secondary component carrier when using carrier aggregation, according to one embodiment.

The BS 102 may include hardware and software components for implementing or supporting implementation of features described herein, such as those described herein with reference to, inter alia, FIG. 6. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein, such as the features described herein with reference to, inter alia, FIG. 6.

Figure 5:
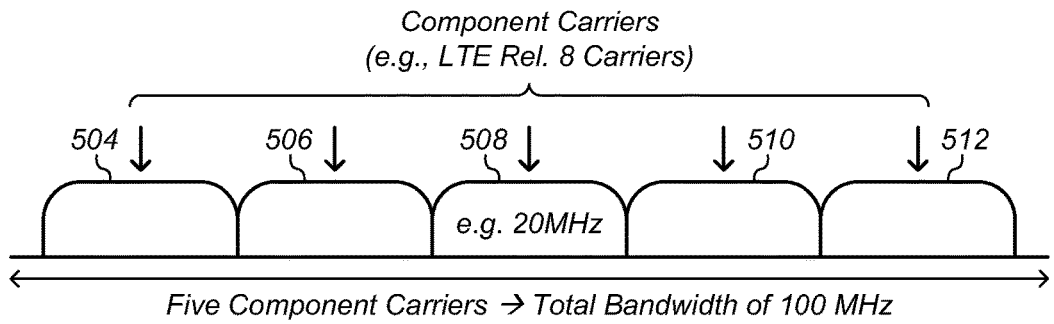
FIG. 5 illustrates an exemplary carrier aggregation scheme, according to one embodiment.

FIG. 5—Carrier Aggregation

Carrier aggregation is a scheme in which multiple carriers (e.g., frequency channels) may be used for wireless communication with a UE according to a wireless communication technology. FIG. 5 illustrates one exemplary carrier aggregation scheme (e.g., which may be used in accordance with the LTE radio access technology) which may be used in accordance with other aspects of this disclosure, such as with respect to the method of FIG. 6.

In the illustrated scheme, up to five component carriers (carriers 504, 506, 508, 510, 512) may be aggregated for a single user device (such one of the UEs 106 illustrated in and described with respect to FIGS. 1-3). Each component carrier may use a channel width of up to 20 MHz. As one possibility, each component carrier may be an LTE release 8 carrier. Thus, according to the exemplary scheme, a UE may be allocated up to 100 MHz of bandwidth. In many instances, such a carrier aggregation scheme may enable a UE participating in it with greater throughput than without such a scheme.

In many cases, component carriers may utilize adjacent frequency channels. However, it should be noted that it is also possible to implement carrier aggregation utilizing non-continuous frequency channels, potentially including non-continuous frequency channels within the same frequency band, and/or frequency channels within different frequency bands.

For systems which implement carrier aggregation, various control schemes/mechanisms are possible. As one possibility, an independent cell may be implemented on each component carrier, for example by providing a control channel with data scheduling and other control features for each cell on the component carrier for that cell. As another possibility, some or all control functions may be centralized. For example, a "primary cell" might be implemented on one ("primary") component carrier, while "secondary cells" might be implemented on any additional ("secondary") component carriers, such that some or all control information for the secondary cells is communicated by way of the primary cell.

In many instances, such secondary cells may be activated only on an "as-needed" basis, and may be used primarily for best effort (e.g., lower-priority) downlink data. For example, a secondary component carrier might be activated if there is downlink data for a wireless device beyond the amount that can be handled by the primary component carrier for the wireless device, if radio conditions are sufficiently good for the secondary component carrier. Activation may be by a media access control (MAC) control packet/control element; once the secondary component carrier is activated, a downlink grant may be assigned to the wireless device on the secondary component carrier (e.g., in addition to a downlink grant on the primary component carrier), and the wireless device may receive downlink data on both the primary component carrier and the secondary component carrier. If the network detects or is informed by the wireless device that the radio conditions for the secondary component carrier are degraded, or if downlink data for the wireless device can be handled solely using the primary component carrier, the network may deactivate the secondary component carrier.

It should be noted that while the exemplary scheme illustrated in FIG. 5 and the associated description are provided by way of example as one possible manner of implementing carrier aggregation, they are not intended to be limiting to the disclosure as a whole. Numerous alternatives to and variations of the details thereof are possible and should be considered within the scope of the present disclosure. For example: carrier aggregation schemes may be implemented in conjunction with other wireless communication technologies; carriers according to other LTE releases or other radio access technologies altogether may be used; carriers having different channel widths may be used; different numbers of component carriers may be supported; and/or any of numerous other alternatives to and variations of the illustrated scheme are also possible.

FIG. 6—Secondary Component Carrier Management

As noted above, carrier aggregation (e.g., such as supported in LTE) may include the use of multiple component carriers for data communication by a UE. For example, a secondary component carrier (SCC) may be used together with a primary component carrier (PCC) to receive downlink data and/or transmit uplink data in a carrier aggregation scenario. In such a case, the UE may have multiple RF communication chains to support the multiple component carriers; for example, a "first" RF communication chain may be used for the PCC while a "second" RF communication chain may be used for a SCC. However, in addition to using the second RF communication chain with the SCC, a UE may also have other possible uses for the second RF communication chain. For example, in certain circumstances it may be desirable to use the second RF communication chain to tune-away from the SCC to detect and measure a best cell on another RAT, to read target RAT system information, to perform a background PLMN search, and/or for any of various other uses. Accordingly, it may be useful for a UE to implement techniques to manage activation and deactivation of a SCC in light of the various possible uses of its RF communication chains.

FIG. 6 is a flowchart diagram illustrating such a method for a wireless device to manage a secondary component carrier when using carrier aggregation. The method shown in FIG. 6 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 602, the wireless device may communicate with a network on a primary component carrier using a first RF communication chain. The primary component carrier may operate according to a first RAT; for example, the PCC may be an LTE component carrier. The PCC may provide a wireless link between the wireless device and a base station, which may act as a serving or anchor base station for the wireless device.

At some point, the network (by way of the base station) may configure a secondary component carrier for the wireless device. For example, the base station may provide configuration information, such as information indicating a frequency channel on which the secondary component carrier is configured, for the secondary component carrier. Note that the frequency channel of the SCC may be in the same frequency band as the PCC, or may be in a different frequency band, as desired. The configuration information may be provided via RRC configuration information, a MAC control element, or in any other desired manner.

It should be noted that prior to configuration of the SCC by the network, the wireless device may be free to tune its second communication chain for secondary RAT monitoring or any other desired purpose, potentially without affecting the network or communication between the wireless device and the base station. Similarly, if the SCC is configured but not activated, the wireless device may also be able to tune its second communication chain for secondary RAT monitoring or any other desired purpose.

At some point, the base station may determine to activate the SCC. In order to do so, the base station may provide an indication (e.g., a MAC CE) to activate the SCC. In order to complete the activation of the SCC and begin using the SCC to perform communication between the wireless device and the network, it may be expected that the wireless device acknowledge the indication to activate the SCC.

If the second RF communication chain is already in use, at least in some instances it may be preferable for the wireless device to continue the current use of the second RF communication chain rather than use the second RF communication chain for the SCC. In such a case, the wireless device may elect to not acknowledge the indication to activate the SCC. In this case, the SCC will remain inactive, and the wireless device may continue to use the second RF communication chain as previously.

If the second RF communication chain is not in use upon receiving the indication to activate the SCC, the wireless device may proceed to acknowledge the indication to activate the SCC, in which case the SCC may be activated.

In this case, in 604 the wireless device may communicate with the network on the SCC using the second RF communication chain. The SCC may also operate according to the first RAT, and may be configured according to the previously received configuration information. Note that the SCC may provide a link between the wireless device and the serving/anchor base station, or alternatively, may provide a link between the wireless device and a different base station, if desired.

In 606, at some point while the SCC is active and the second RF communication chain is being used in conjunction with the SCC, a trigger condition to deactivate the SCC may be detected. The trigger condition may relate to an alternate use for the second RF communication chain. If desired, multiple possible trigger conditions may be defined (e.g., potentially each relating to a different alternate use for the second RF communication chain).

For example, as one possibility, the trigger condition might include detecting that channel conditions for the PCC have degraded below a channel condition threshold (e.g., one or more of RSRP, RSRQ, CQI, etc. have fallen below a predetermined threshold), and accordingly determining to use the second RF communication chain to search other RATs for a potential backup cell for the PCC.

Such a trigger condition may also be tied to the use of the PCC, if desired. For example, if the PCC is being used for a high priority use, such as a voice call, and PCC channel conditions are poor, user experience may be improved by using the second RF communication chain to speed up a transition of the voice call to another cell on a different RAT (e.g., a circuit switched RAT, such as GSM, WCDMA, CDMA 1xRTT, etc., for circuit switched fallback). In contrast, if no high priority application is using the PCC, it may be considered unnecessary to use the second RF communication chain to search for alternate cells for the PCC.

As another possibility, the trigger condition might relate to the PLMN to which the wireless device is attached and/or the location of the wireless device. For example, if the wireless device is roaming (i.e., attached to a PLMN which is not the home PLMN of the wireless device) but is in a location that is near the service area of its home PLMN (e.g., as may be determined by GPS, serving cell and/or detected cell ids, and/or in any other manner), deactivation of the SCC may be triggered in order to allow the UE to use the second RF communication chain to perform a PLMN search. In such a "border" scenario, it may be preferable for the wireless device to return to its home PLMN instead of roaming as soon as possible, e.g., to avoid roaming charges.

In response to detecting the trigger condition, in 608 the wireless device may cause (or attempt to cause) the network to deactivate the SCC. The wireless device may cause the network to deactivate the SCC either directly (e.g., by sending an indication to the network to deactivate the SCC), or indirectly (e.g., by modifying channel condition feedback in a manner expected to trigger deactivation of the SCC), in various implementations. In order for the wireless device to cause the network to deactivate the SCC directly, a new configuration message (or a new field within an existing configuration message) may be defined for such a purpose. In order for the wireless device to cause the network to deactivate the SCC indirectly, it may be sufficient to use existing mechanisms, such as CQI report feedback or BLER feedback. For example, the wireless device may modify channel condition feedback to indicate worse channel conditions for the SCC than experienced by the wireless device, by indicating a lower than measured CQI value for the SCC to the base station, or by modifying packet acknowledgement behavior to simulate a higher than experienced BLER (e.g., by not acknowledging successful receipt of, or negative acknowledging, packets which were in fact successfully received by the wireless device).

Based on such actions by the wireless device, the base station may send an indication to the wireless device to deactivate the SCC. However, in case the base station does not deactivate the SCC (or does not do so in a timely manner), in some instances the wireless device may initiate a timer after acting to cause the network to deactivate the SCC. The wireless device may then continue to use the second RF communication chain to communicate with the first network using the secondary component carrier until the earlier or expiration of the timer or reception of an indication to deactivate the SCC. Once either the timer has expired or the indication to deactivate the SCC is received, the wireless device may cease using the second RF communication chain to communicate with the first network using the secondary component carrier. Note that the timer may have any (e.g., predetermined) length, as desired; as one specific possibility, the timer may have a 50 ms length. Any of various other lengths (e.g., 20 ms, 80 ms, 100 ms, 150 ms, etc.) may be used as desired.

Alternatively, if the base station does not deactivate the SCC in a timely manner, the wireless device may continue to use the second RF communication chain to communicate with the first network using the secondary component carrier indefinitely, but may periodically tune-away for alternate purposes during idle periods (e.g., of C-DRX cycles), if desired.

In 610, the wireless device may utilize the second RF communication chain for an alternate purpose. As noted above, the alternate purpose may correspond to the trigger condition on which basis the wireless device caused the SCC to be deactivated. For example, if the trigger condition related to channel conditions of the PCC falling below a channel condition threshold, the wireless device may use the second RF communication chain to perform an inter-RAT (iRAT) search and/or measurement (e.g., to find a potential target inter-RAT cell) as a further response to the trigger condition. In some instances, the wireless device may further use the second RF communication chain to read system information (e.g., from a system information block broadcast by that target cell) for such a target inter-RAT cell, in order to further facilitate a transition to that target cell if such a handover is triggered (e.g., by further degradation/failure of the PCC). As another example, if the trigger condition related to the wireless device roaming and being near a service area of a home PLMN of the wireless device, the wireless device may use the second RF communication chain to perform a PLMN search as a further response to the trigger condition. In such case, if the HPLMN of the wireless device is discovered, the wireless device may attach to the HPLMN of the wireless device.

Thus, using the method of FIG. 6, a wireless device may be able to free its second RF communication chain from SCC traffic and use the second RF communication chain to monitor other RATs, search for PLMNs, or perform other uses, as needed. Once such uses are complete or no longer necessary, the wireless device may indicate to the base station that the SCC may be activated again, for example by no longer modifying channel condition feedback or explicitly indicating to the base station to re-activate the SCC. Based on this, the base station may indicate to the wireless device to re-activate the SCC, such that the wireless device may again gain the benefit of use of the SCC. Such techniques may help minimize radio link resource waste for the wireless device and the network in general.

Such techniques may substantially improve inter-RAT transition times compared to existing techniques, at least in some instances. For example, if a wireless device is in LTE traffic and inter-RAT activity such as search/measurement or PLMN search is triggered, the wireless device might stop current LTE traffic and tune the receiving RF chains to the target RAT. However, in order to minimize interruption to current LTE traffic, the wireless device may be keep the tune away duration relatively short, which may in turn cause the wireless device to take several cycles to complete the iRAT measurements for all candidates, and hence substantially delay the iRAT decision. Furthermore, the wireless device may not have sufficient time to read system information for the target RAT. Thus, when the iRAT transition actually happens, the transition period may be relatively long since the wireless device may still need to decode the system information and send a registration/location update. The data outage period may accordingly be relatively long for such a wireless device. In contrast, using the method of FIG. 6, the wireless device may be able to release its second RF communication chain from traffic in appropriate circumstances and perform search/measurement operations and read system information as needed, such that if an iRAT transition is indeed triggered, the target cell may already be acquired and data interruption for the primary component carrier may be minimized.

As previously noted, the method of FIG. 6 may be used in some instances in conjunction with VoLTE calls. In particular, the method may be helpful for handling VoLTE call setup issues due to poor PCC radio conditions, such as if a wireless device's random access channel (RACH) request for call setup does not reach the network due to high interference or congestion. In such a case, VoLTE call setup may be unsuccessful due to radio condition degradation.

In case of such a VoLTE call setup/maintenance failure, the wireless device may need to provide an alternative way to setup the voice call, e.g., using a legacy RAT (GSM, WCDMA, CDMA 1x). If this process is not begun until the VoLTE call setup actually fails, finding a suitable cell on a legacy RAT may take a considerable amount of time (e.g., possibly more than 10 seconds) and before initiating the voice call, a location update may be necessary. A single RF communication chain could alternatively be multiplexed between LTE and a legacy RAT when LTE radio conditions degrade to certain level; however, in this case the tune-away periods to use the legacy RAT may cause LTE data (e.g., potentially including VoLTE data) to be lost. By using the method of FIG. 6, however, when the LTE DL/UL link reaches the poor condition threshold, a second RF communication chain of the wireless device may be used to measure one or more CS RATs periodically. In this case, the measurement periodicity may not be restricted to the CS RAT's DRX paging cycle: measurements may not only be performed over a longer length of time, if desired, but also may be performed at a time when the wireless device is receiving less (or no) data (e.g., idle time during LTE C-DRX) and which is not a paging occasion according to the CS RAT.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE), comprising:
a first RF communication chain;
a second RF communication chain; and
a processing element operably coupled to the first and second RF communication chains,
wherein the UE is configured to:
    communicate with a first network according to a first radio access technology (RAT) via a base station using a primary component carrier and a first communication chain;
    receive configuration information for a secondary component carrier from the base station;
    receive an indication to activate the secondary component carrier from the base station;
    determine whether the second RF communication chain is in use when the indication to activate the secondary component carrier is received;
    when the second RF communication chain is in use;
        determine whether to discontinue a current use of the second RF communication chain;
    when the second RF communication chain is not in use or it is determined to discontinue the current use of the second RF communication chain;
        acknowledge the indication to activate the secondary component carrier;
        communicate with the first network according to the first RAT using the secondary component carrier and the second RF communication chain;
        detect a trigger condition to deactivate the secondary component carrier; and
        transmit an indication causing the base station to deactivate the secondary component carrier based on detecting the trigger condition.

2. The UE of claim 1,
wherein the indication causing the base station to deactivate the secondary component carrier comprises modified channel condition feedback indicating worse channel conditions for the secondary component carrier than experienced by the UE.

3. The UE of claim 1,
wherein if the second RF communication chain is in use when the indication to activate the secondary component carrier is received, the UE is further configured to not acknowledge the indication to activate the secondary component carrier.

4. The UE of claim 1,
wherein the trigger condition comprises channel conditions of the primary component carrier falling below a channel condition threshold,
wherein the UE is further configured to use the second RF communication chain to perform an inter-RAT search in response to the trigger condition.

5. The UE of claim 4,
wherein the first RAT is LTE, wherein the trigger condition further comprises the primary component carrier being used for a VoLTE call,
wherein the UE is further configured to use the second RF communication chain to search for a potential cell for circuit-switched fallback for the VoLTE call in response to the trigger condition.

6. The UE of claim 1,
wherein the trigger condition comprises the UE roaming and being near a service area of a home public land mobile network (PLMN) of the UE,
wherein the UE is further configured to perform a PLMN search in response to the trigger condition.

7. The UE of claim 1, wherein the UE is further configured to:
initiate a timer upon transmitting the indication instructing the base station to deactivate the secondary component carrier;
continue to use the second RF communication chain to communicate with the first network according to the first RAT using the secondary component carrier until the earlier of expiration of the timer or reception of an indication to deactivate the secondary component carrier;
cease using the second RF communication chain to communicate with the first network according to the first RAT using the secondary component carrier after the earlier of expiration of the timer or reception of an indication to deactivate the secondary component carrier.

8. The UE of claim 1, wherein the UE is further configured to not acknowledge the indication to activate the secondary component carrier when it is determined not to discontinue the current use of the second RF communication chain.

9. The UE of claim 1, wherein the current use of the second RF communication chain comprises secondary RAT monitoring.

10. A method, comprising:
by a wireless user equipment (UE) device:
communicating with a first network according to a first radio access technology (RAT) via a first base station using a primary component carrier and a first communication chain;
receiving configuration information for a secondary component carrier from the base station;
receiving an indication to activate the secondary component carrier from the base station;
determining whether the second RF communication chain is in use when the indication to activate the secondary component carrier is received;
when the second RF communication chain is in use;
determining whether to discontinue a current use of the second RF communication chain;
when the second RF communication chain is not in use or it is determined to discontinue the current use of the second RF communication chain;
acknowledging the indication to activate the secondary component carrier;
communicating with the first network according to the first RAT using a secondary component carrier and a second communication chain;
detecting a trigger condition to deactivate the secondary component carrier;
modifying at least one of channel condition feedback or block error rate feedback for the secondary component carrier in response to detecting the trigger condition to cause the base station to deactivate the secondary component carrier.

11. The method of claim 10, the method further comprising:
receiving an indication to deactivate the secondary component carrier from the base station in response to the modified channel condition measurement results and/or block error rate feedback.

12. The method of claim 10, wherein the trigger condition comprises radio conditions for the primary component carrier degrading below a first threshold, the method further comprising:
performing inter-RAT search and measurement operations using the second communication chain in response to detecting the trigger condition.

13. The method of claim 12, wherein the first RAT is LTE, wherein the primary component carrier is used for a VoLTE call, the method further comprising:
performing measurement operations according to one or more circuit switched RATs using the second communication chain in response to detecting the trigger condition.

14. The method of claim 12, the method further comprising:
determining a target RAT based on the inter-RAT search and measurement operations; and
attempting to decode system information for the target RAT using the second communication chain.

15. The method of claim 10, wherein the trigger condition comprises detecting that the UE is near a service area of a home public land mobile network (PLMN) of the UE while the UE is roaming, the method further comprising:
performing a PLMN search using the second communication chain in response to detecting the trigger condition.

16. A non-transitory computer accessible memory medium comprising program instructions which, when executed at a user equipment (UE) device, cause the UE to:
establish a primary component carrier with a first base station according to a first radio access technology (RAT) using a first RF communication chain;
receive configuration information for a secondary component carrier from the first base station;
receive an indication to activate the secondary component carrier from the first base station,
wherein when a second RF communication chain is in use when the indication to activate the secondary component carrier is received, the UE is configured to determine whether to discontinue a current use of the second RF communication chain, and
wherein when the second RF communication chain is not in use when the indication to activate the secondary component carrier is received or it is determined to discontinue the current use of the second RF communication chain, the UE is configured to acknowledge the indication to activate the secondary component carrier, activate the secondary component carrier, and communicate with the first network according to the first RAT using the secondary component carrier and the second RF communication chain.

17. The memory medium of claim 16, wherein when executed, the program instructions further cause the UE to:
   determine that the primary component carrier has a link quality below a predetermined threshold;
   utilize the second RF communication chain to search for inter-RAT cells in response to determining that the primary component carrier has a link quality below a predetermined threshold.

18. The memory medium of claim 16, wherein when executed, the program instructions further cause the UE to:
   determine that the UE is near a service area of a home public land mobile network (PLMN) of the UE while the UE is roaming;
   utilize the second RF communication chain to perform a PLMN search in response to determining that the UE is near a service area of the home PLMN of the UE while the UE is roaming.

19. The memory medium of claim 16, wherein when the secondary component carrier is active, the program instructions further cause the UE to:
   detect a trigger condition to deactivate the secondary component carrier;
   modify channel condition feedback to the base station for the secondary component carrier in response to detecting the trigger condition to indicate worse channel conditions for the secondary component carrier than experienced by the UE.

20. The memory medium of claim 19,
   wherein to modify channel condition feedback, the program instructions further cause the UE to indicate a lower than measured channel quality indicator (CQI) value to the base station.

21. The memory medium of claim 19,
   wherein to modify channel condition feedback, the program instructions further cause the UE to modify its packet acknowledgement behavior to simulate a higher than experienced block error rate (BLER).

22. The memory medium of claim 19, wherein when executed, the program instructions further cause the UE to:
   wait up to a predetermined amount of time to receive an indication to deactivate the secondary component carrier from the first base station after modifying channel feedback to the base station, wherein the UE continues to use the second communication chain to communicate via the secondary component carrier while waiting; and
   upon expiration of the predetermined amount of time or upon receiving an indication to deactivate the secondary component carrier from the first base station, utilize the second communication chain for an alternate use.

* * * * *